United States Patent
Chiu et al.

(10) Patent No.: US 6,320,353 B1
(45) Date of Patent: Nov. 20, 2001

(54) BATTERY CHARGER HAVING A INTERCHANGEABLE PLUG DEVICE

(75) Inventors: Chung-Jung Chiu; Chin-Ping Dai; Jui-Feng Liao, all of Taipei (TW)

(73) Assignee: Leader Electronics Inc., Taipei (TW)

( * ) Notice: Subject to any disclaimer, the term of this patent is extended or adjusted under 35 U.S.C. 154(b) by 0 days.

(21) Appl. No.: 09/768,961

(22) Filed: Jan. 24, 2001

(51) Int. Cl.⁷ ........................................ H02J 7/02
(52) U.S. Cl. ............................... 320/111; 320/107
(58) Field of Search .......................... 320/111, 107, 320/113

(56) References Cited

U.S. PATENT DOCUMENTS 5,634,806 * 6/1997 Hahn ................................ 439/173
5,648,712 * 7/1997 Hahn ................................ 320/111
5,684,689 * 11/1997 Hahn ................................ 363/146

\* cited by examiner

*Primary Examiner*—Peter S. Wong
*Assistant Examiner*—Lawrence Luk
(74) *Attorney, Agent, or Firm*—William E. Pelton, Esq.

(57) ABSTRACT

A battery charger having a detachable plug has a charger body and a changeable plug provided with a first plate and second plate. The second plate has at least two conductor blades extending out therefrom. The plug is detachably connected to the charger body by the first retaining device on the first plate and the second retaining device on the second plates. Therefore, the battery charger is securely and electrically insertable in an outlet of a power supply.

8 Claims, 6 Drawing Sheets

BATTERY CHARGER HAVING A INTERCHANGEABLE PLUG DEVICE

BACKGROUND OF THE INVENTION

1. Field of the Invention

The present invention relates to a battery charger having an interchangeable plug device, and more particularly, to a battery charger having a charger body and a plug for connecting to the charger body securely.

2. Description of Related Art

With reference to FIG. 7, a conventional battery charger has a charger body (50) and a plug (60) separately connecting to the charger body (50).

A notch (51) formed in the shape of a figure 8 is defined in a top face of the charger body (50), and the two conductor pins (511) are respectively formed in two circular portions of the notch (51).

The plug (60) has a plug base (61) and two conductor blades (62) formed on an outer side of the plug base (61). The plug base (61) includes a socket (611) formed in the shape of a FIG. 8 extending downwardly from a bottom side of the plug base (61), and two conductor seats (612) respectively formed in two circular portions of the convex object (611).

In assembly, the socket (611) is inserted into the notch (51), and then each of the two conductor pins (511) of the charger body (50) electrically contacts a respective one of the two conductor seats (612) of the plug base (61).

When the conductor blades (62) of the battery charger are inserted into an outlet of a power source, the battery charger is easily separated from the outlet because there is only one fulcrum between the charger body (50) and the plug base (61).

The above-mentioned battery charger is easily assembled, however it has the shortcoming that the charger body is easily separated from the power supply. Therefore the battery charger does not charge successfully or safely.

To overcome the shortcomings, the present invention tends to provide an improved plug for a combination plug to mitigate and obviate the aforementioned problems.

SUMMARY OF THE INVENTION

The objective of the present invention is to provide a battery charger having a detachable plug for securely connecting an outlet of a power supply.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
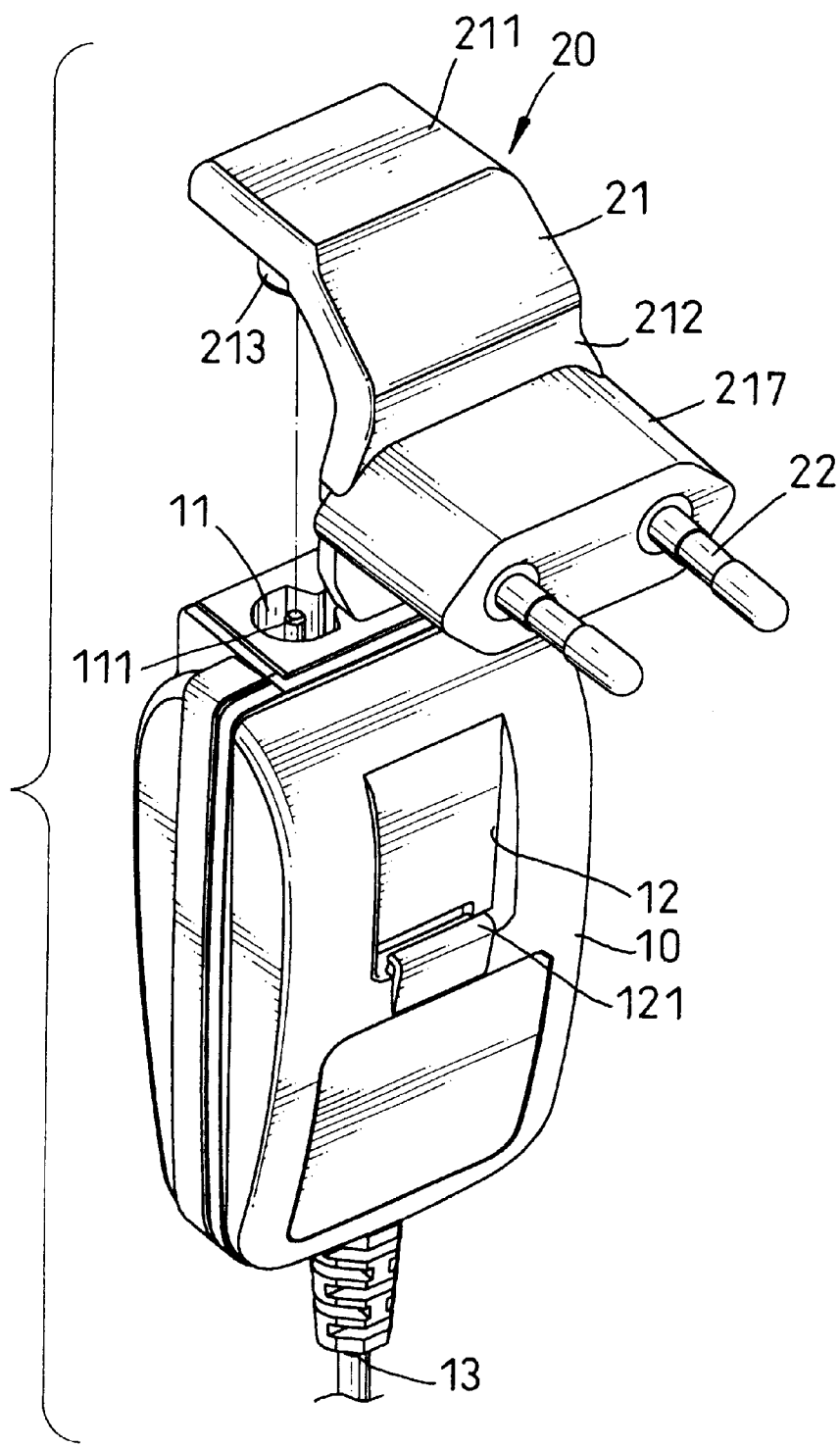
FIG. 1 is an exploded perspective view of a battery charger having an interchangeable plug device in accordance with the present invention.

With reference to FIG. 1, a battery charger includes a charger body (10), and a plug (20) connecting to the charger body (10).

Figure 3:
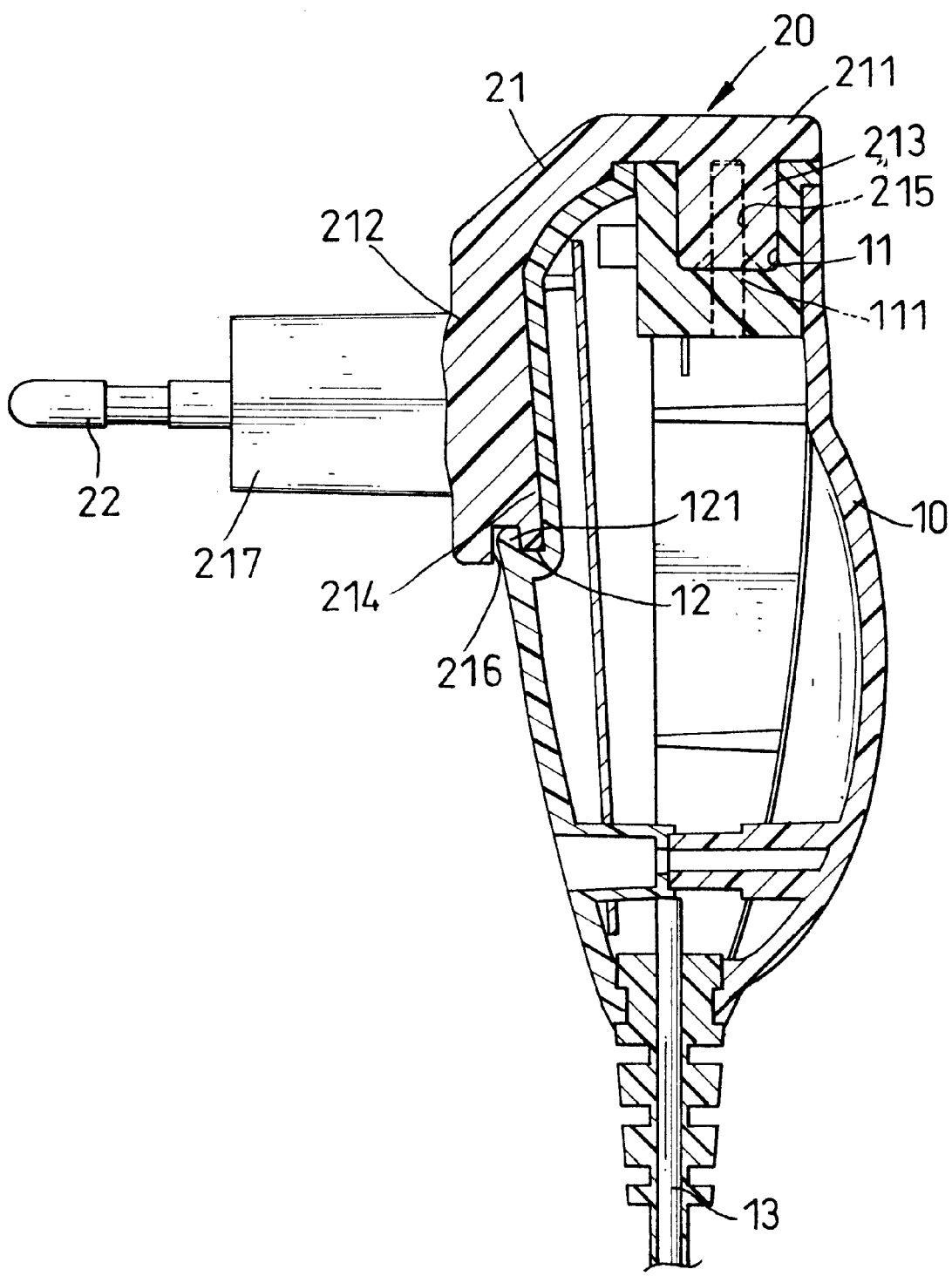
FIG. 3 is a partially cross-sectional side view of a battery charger having an interchangeable plug device in accordance with the present invention.

The charger body (10) is substantially rectangular and two opposite long sides thereof are each a cambered surface. The charger body (10) has a notch (11) formed in the shape of a FIG. 8 and defined in a top face thereof and a recess (12) defined in one of the long sides. Two conductor pins (111) are respectively formed in two circular portions of the notch (11). A lip (121) is formed on the long side of the charger body (10) and below the recess (12), wherein a top edge of the lip (121) is extended upward to a bottom wall of the recess (12), as shown in FIG. 3. A cable (13) extends from a bottom of the charger body (10) for connection with an appliance (not shown), and a conventional circuit is formed between the cable (13) and the conductor pins (111) of the notch (11).

Figure 2:
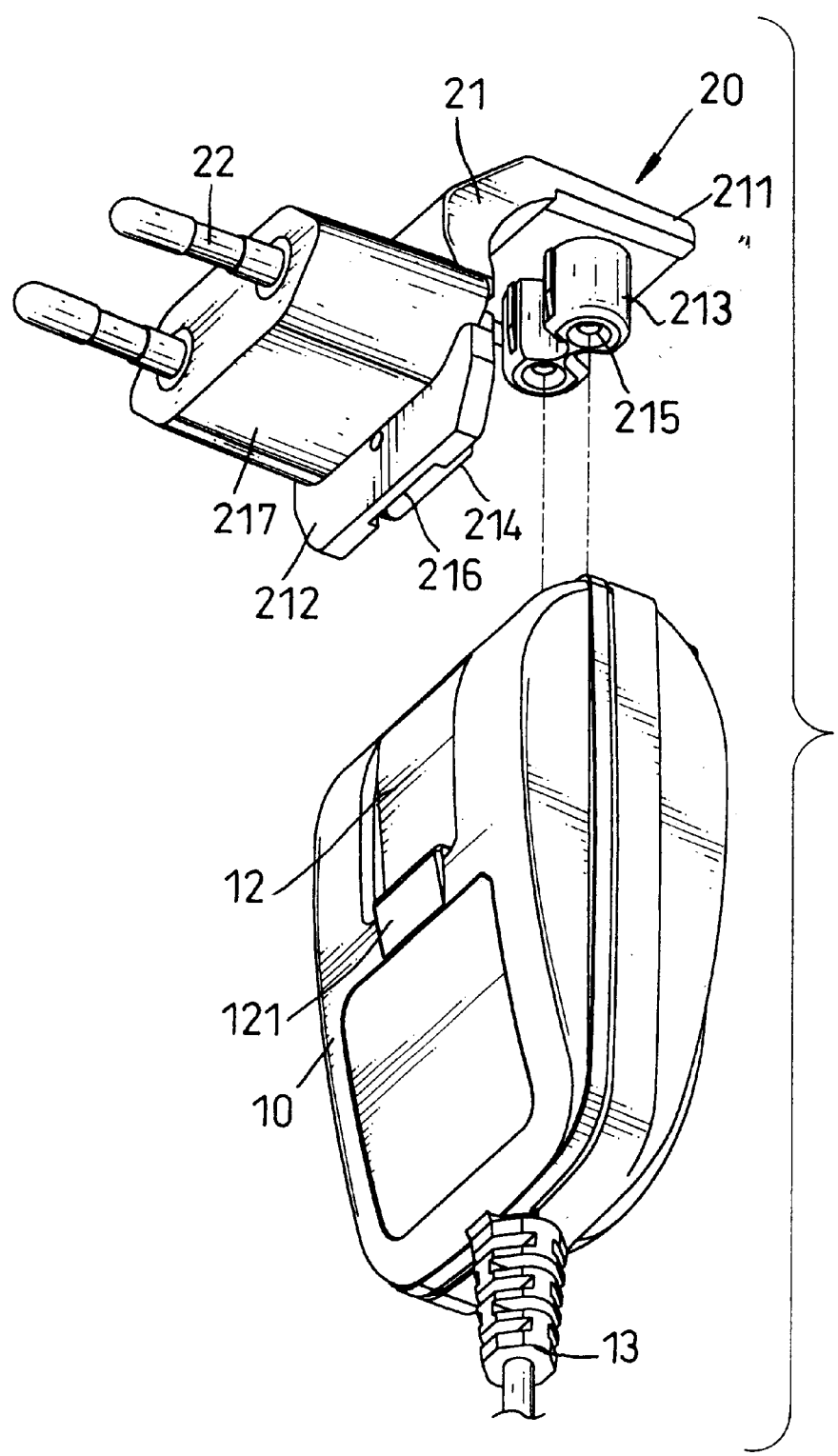
FIG. 2 is another exploded perspective view of a battery charger having an interchangeable plug device in accordance with the present invention.

Referring to FIGS. 1 and 2, the plug (20) includes an plug base (21) with an first plate (211) and a resilient second plate (212) substantially in right angle to and in one piece with the first plate (211), and a connector (217) extending laterally from the second plate (212). At least two conductor blades (22) protrude from a distal end of the second plate (212). With reference to FIGS. 2 and 3, a socket (213) formed as a figure 8 extends downwardly from a bottom side of the first plate (211), and two conductor seats (215) are respectively defined in each of two circular portions of the socket (213). A board (214) extends from an inner surface of the second plate (212), and a notch (216) is defined in a bottom face of the board (214).

Figure 4:
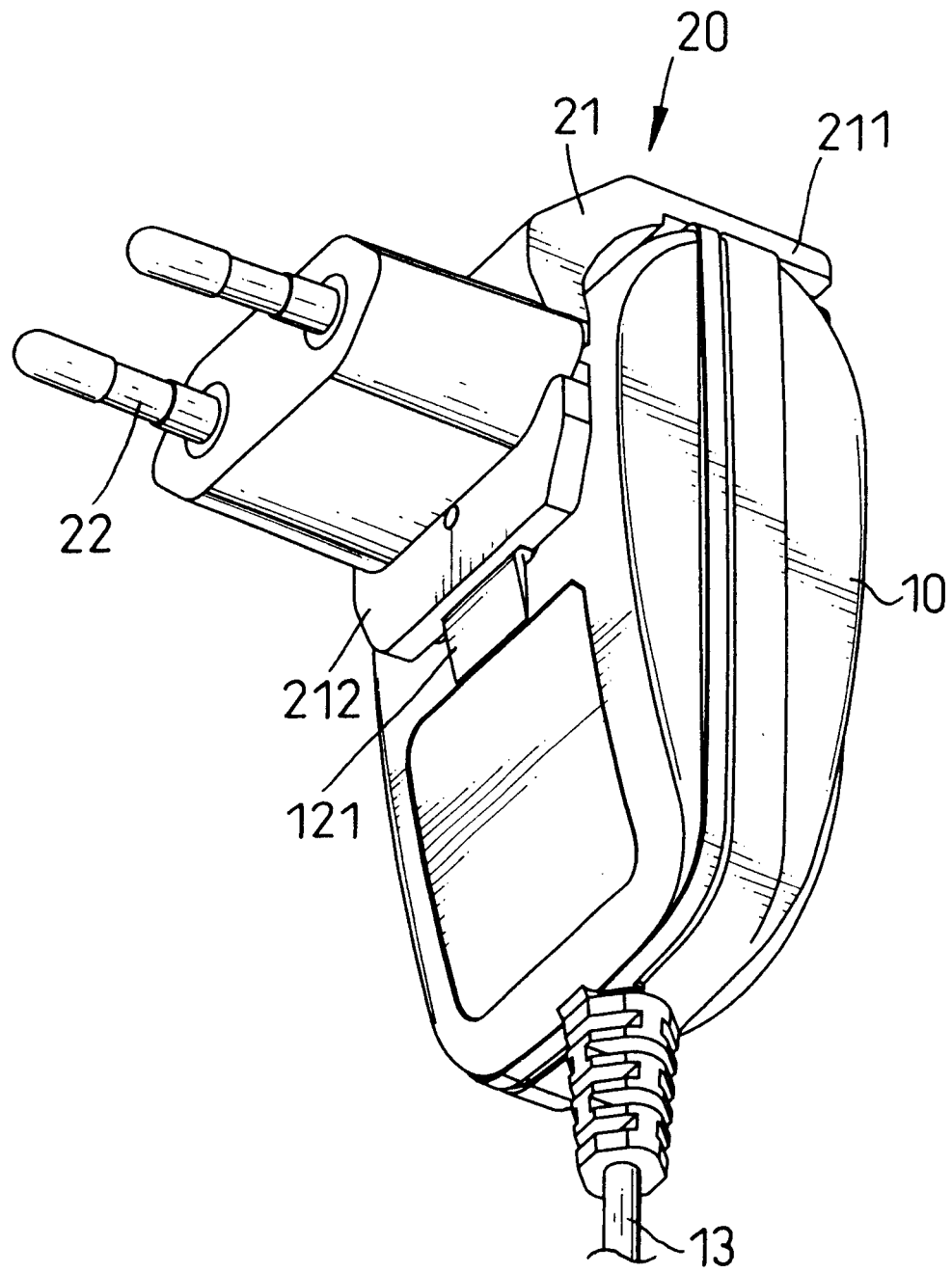
FIG. 4 is a perspective view of a battery charger having an interchangeable plug device in accordance with the present invention.

In assembly, with reference to FIGS. 3 and 4, the plug base (21) is inserted into the charger body (10), that is, the second plate (212) slightly deforms and then smoothly slips into the recess (12) of the charger body (10).Whereby, the top edge of the lip (121) is securely inserted in the slot (216) of the board (214). At the same time, the socket (213) of the first plate (211) wedges in the notch (11) of the charger body (10), and the two conductor pins (11) respectively electrically contact with the two conductor seats (215). The conductor blades (22) are then inserted in an appropriate mains supply outlet in a wall, whereby electricity passes from the conductor blades (22) to the cable (13) via the socket (213) and the conductor pins (11).

Figure 5:
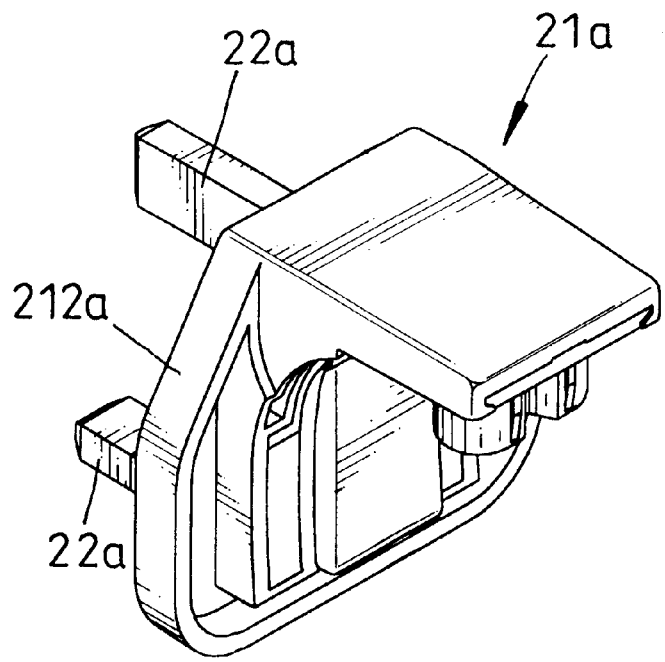
FIG. 5 is a perspective view of a second embodiment of a plug device used together with the battery charger in accordance with the present invention.
Figure 6:
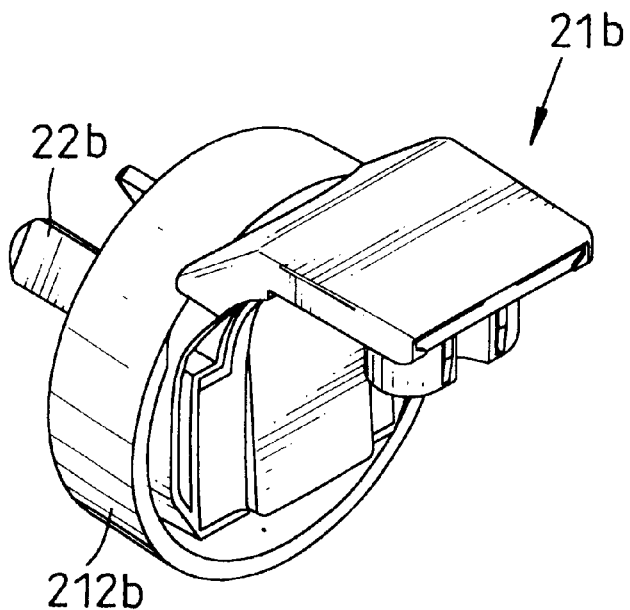
FIG. 6 is a perspective view of a third embodiment of a plug device used together with the battery charger in accordance with the present invention.
Figure 7:
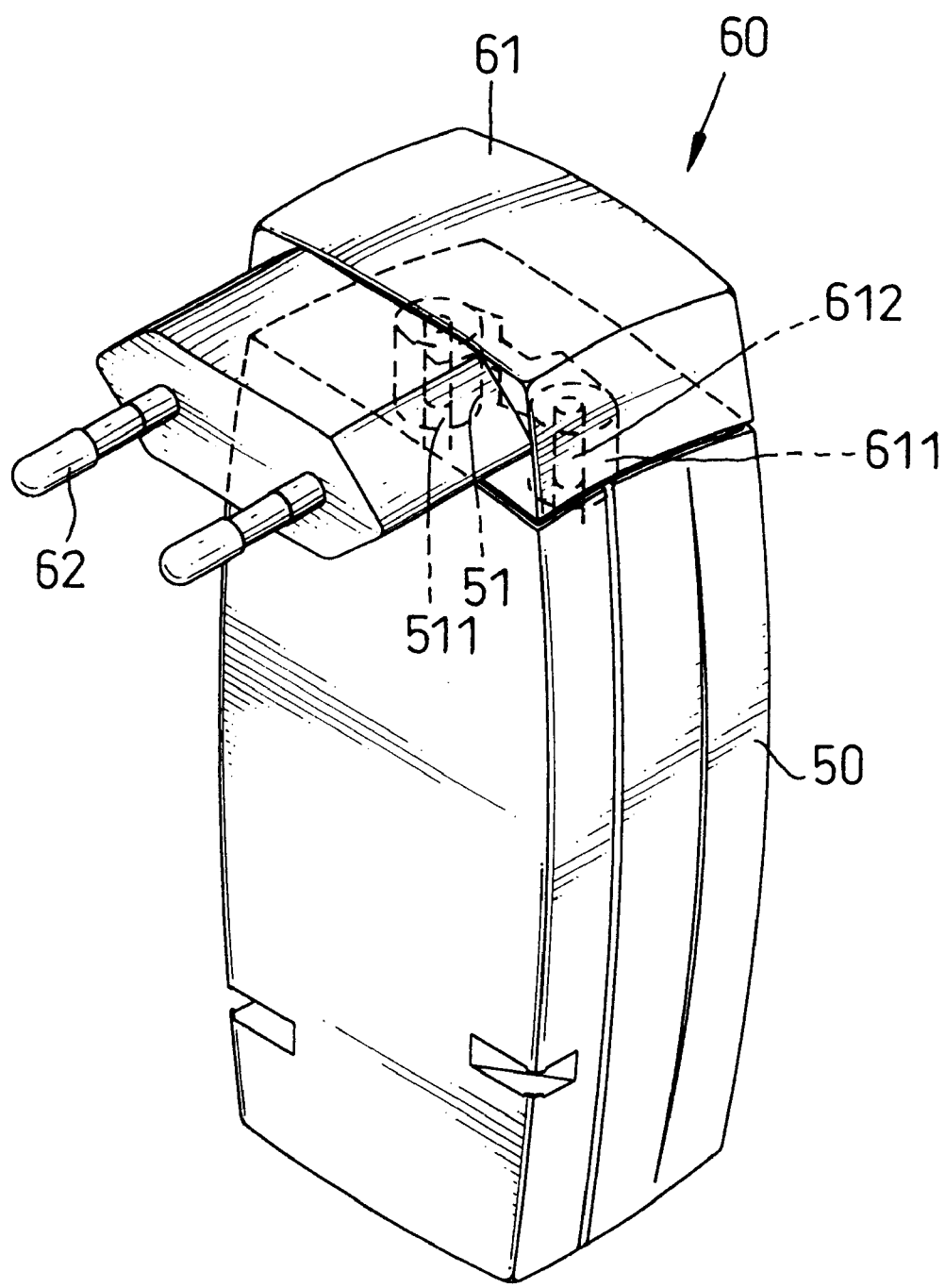
FIG. 7 is an exploded perspective view of a conventional battery charger.

Referring to FIGS. 2 and 5, a second embodiment of the plug base (21a) is shown wherein the difference between the plug base (21) of the first embodiment and the plug base (21a) of the second embodiment is that the conductor blades (22a) are formed on the second plate (212a) which is formed as a to suit a three blade outlet.

Referring to FIGS. 2and 6, a third embodiment of the plug base (21b) is shown wherein the difference between the plug base (21) of the first embodiment and the plug base (21b) of the third embodiment is that the conductor blades (22b) are formed on the second plate (212b) which is formed as a circle.

When the assembled battery charger is inserted into an outlet on a power supply, the battery charger does not shake and does not separate from the outlet, because the first and second plates (211, 212) together provide a secure support to the battery charger.

The battery charger having a detachable plug in accordance with the present invention is able to receive any one of a range of specific plugs, and is securely connectable to the outlet of the power supply base.

Although the present invention has been explained in relation to its preferred embodiment, it is to be understood that many other possible modifications and variations can be made without departing from the spirit and scope of the invention as hereinafter claimed.

What is claimed is:

1. A battery charger having an interchangeable plug device comprising:
   a charger body having a notch defined in a top side of the charger body, a first retaining device formed on a long side adjacent to the top side, and two conductor pins formed in the notch;
   a plug detachably connected to the charger body and having a first plate provided with at least one socket formed to correspond to and electrically connected to the conductor pins of the charger body and a second plate substantially in right angle to and in one piece with the first plate;
      wherein the second plate has at least two conductor blades formed on an outer surface of the second plate and electrically connected with the at least one socket, and
   a second retaining device formed on an inner surface of the second plate to correspond to the first retaining device to secure the connection between the plug and the charger body when the plug and the charger body is assembled.

2. The battery charger as claimed in claim 1, wherein the first retaining device is a recess and the second retaining device is a board.

3. The battery charger as claimed in claim 2, wherein the notch and the socket are each formed in the shape of a figure 8, and a size of the socket is slightly smaller than that of the notch.

4. The battery charger having an interchangeable plug device as claimed in claim 3, wherein a lip is formed on the long side face of the charger body and below the recess, and a top edge of the lip extends into the recess, wherein a slot is defined in a bottom face of the board and corresponds to the lip of the charger body, such that after the board rests in the recess, the engagement between the lip and the slot is able to secure the engagement between the charger body and the plug.

5. The battery charger as claimed in claim 1, wherein the second plate has three connector blades.

6. The battery charger as claimed in claim 5, wherein the first retaining device is a recess and the second retaining device is a board.

7. The battery charger as claimed in claim 6, wherein the notch and the socket are each formed in the shape of a figure 8, and a size of the socket is slightly smaller than that of the notch.

8. The battery charger as claimed in claim 7, wherein a lip is formed on the long side face of the charger body and below the recess, and a top edge of the lip extends into the recess, wherein a slot is defined in a bottom face of the board and corresponds to the lip of the charger body, such that after the board rests in the recess, the engagement between the lip and the slot is able to secure the engagement between the charger body and the plug.

* * * * *